United States Patent
Violo et al.

(10) Patent No.: US 10,855,068 B2
(45) Date of Patent: Dec. 1, 2020

(54) GROUND FAULT MONITORING SYSTEM AND METHOD

(71) Applicants: Paul Violo, Erin (CA); George De Francesca, Toronto (CA)

(72) Inventors: Paul Violo, Erin (CA); George De Francesca, Toronto (CA)

(73) Assignees: Paul Violo, Erin (CA); George De Francesca, Toronto (CA)

( * ) Notice: Subject to any disclaimer, the term of this patent is extended or adjusted under 35 U.S.C. 154(b) by 325 days.

(21) Appl. No.: 15/997,945

(22) Filed: Jun. 5, 2018

(65) Prior Publication Data

US 2018/0366940 A1    Dec. 20, 2018

Related U.S. Application Data (60) Provisional application No. 62/521,678, filed on Jun. 19, 2017.

(51) Int. Cl.
| | |
|---|---|
| *H02H 3/16* | (2006.01) |
| *H02H 3/10* | (2006.01) |
| *H01H 83/02* | (2006.01) |
| *H02H 5/10* | (2006.01) |
| *H02H 3/04* | (2006.01) |
| *H02H 3/33* | (2006.01) |
| *H02H 1/00* | (2006.01) |

(52) U.S. Cl.
CPC ............ *H02H 3/165* (2013.01); *H01H 83/02* (2013.01); *H02H 3/04* (2013.01); *H02H 3/162* (2013.01); *H02H 3/33* (2013.01); *H02H 5/105* (2013.01); *H02H 1/0007* (2013.01); *H02H 1/0061* (2013.01); *H02H 3/105* (2013.01)

(58) Field of Classification Search
CPC ......... H02H 3/105; H02H 3/162; H02H 3/165
USPC ................................ 361/42, 49, 50
See application file for complete search history.

(56) References Cited

U.S. PATENT DOCUMENTS

| | | | |
|---|---|---|---|
| 7,312,964 B2 | 12/2007 | Tchernobrivets | |
| 9,331,470 B1* | 5/2016 | Flegel | H02H 3/33 |
| 2002/0008950 A1* | 1/2002 | Kim | H02H 3/04 |
| | | | 361/42 |
| 2005/0180069 A1* | 8/2005 | Tchernobrivets | H02H 3/162 |
| | | | 361/46 |
| 2009/0147413 A1* | 6/2009 | Aoki | H05B 6/666 |
| | | | 361/42 |

OTHER PUBLICATIONS

Taskinen, Pentti, Monitor Ground Fault Leakage Currents, Electrical Construction & Maintenance (EC&M), Jan. 1, 1999, http://ecmweb.com/print/content/monitor-ground-fault-leakage-currents?eid=forward.

* cited by examiner

*Primary Examiner* — Gary A Nash
(74) *Attorney, Agent, or Firm* — Rowand LLP (57) ABSTRACT

A ground fault monitoring system for an electrical service panel is provided. The ground fault monitoring system includes a current transformer coupled to a primary bonding location of the electrical service panel. The ground fault monitoring system also includes a current monitoring device in communication with the current transformer to detect ground fault electrical current returning to the electrical service panel. The ground fault monitoring system also includes a ground fault output interface in communication with the current monitoring device to provide ground fault status of the electrical service panel.

18 Claims, 4 Drawing Sheets

GROUND FAULT MONITORING SYSTEM AND METHOD

FIELD

The present application generally relates to electrical service panels, and in particular to ground fault monitoring systems for electrical service panels.

BACKGROUND

An electricity supply system for a building includes an electrical service panel for dividing an electrical power feed into subsidiary circuits. The electrical service panel may include circuit breakers or protective fuses for load circuits. In a residential home, for example, branch circuits and feeders, along with various metallic systems found within the home, are connected back to the electrical service panel.

A ground fault is an unintentional, electrically conducting connection between (1) an ungrounded and energized conductor of an electrical circuit; and (2) normally non-current carrying conductors, metallic enclosures, metallic equipment, or earth. Ground faults may be caused by faulty or damaged electrical load devices. Ground faults may also be caused by incorrect connections made during the design, installation, or maintenance of the electricity supply system. Undetected or un-remedied ground faults may cause undesired effects ranging from noise affecting electrically sensitive electronic devices to electrical fires.

BRIEF DESCRIPTION OF THE DRAWINGS

Reference will now be made, by way of example, to the accompanying drawings which show example embodiments of the present application.

Similar reference numerals may have been used in different figures to denote similar components.

DESCRIPTION OF EXAMPLE EMBODIMENTS

In one aspect, the present application describes a ground fault monitoring system for an electrical service panel. The ground fault monitoring system includes a current transformer coupled to a primary bonding location of the electrical service panel; a current monitoring device in communication with the current transformer to detect ground fault electrical current returning to the electrical service panel; and a ground fault output interface in communication with the current monitoring device to provide ground fault status of the electrical service panel.

In another aspect, the present application describes a method of retrofitting an electrical service panel to detect ground fault electrical current. The method includes removing a main bonding jumper from a primary bonding location of the electrical service panel. Removing the main bonding jumper isolates a neutral bus from a grounding electrode conductor of the electrical service panel. The method also includes installing an auxiliary bonding jumper at the primary bonding location to provide a low-impedance path between the neutral bus and the grounding electrode conductor of the electrical service panel. The auxiliary bonding jumper is passed through a current transformer positioned within the electrical service panel. The method also includes configuring the current transformer to be removeably connected to a current monitoring device for detecting ground fault electrical current returning to the electrical service panel.

Other aspects and features of the present application will be understood by those of ordinary skill in the art from a review of the following description of examples in conjunction with the accompanying figures.

In the present application, the term "and/or" is intended to cover all possible combination and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the field of electricity supply systems, electrical service panels are commonly installed in buildings, such as homes, schools, and office buildings. Electrical service panels may include circuit breakers or protective fuses designed to protect electrical circuits from damage caused by current in excess of current ratings. Excess current may result from circuit overloads or short circuits. A short circuit may occur when a hot wire comes into contact with an associated neutral wire, causing large current flow in a respective circuit. Circuit breakers or protective fuses function to interrupt current flow when excess current beyond a predetermined safe amount of current flow is detected as flowing through a circuit breaker or protective fuse.

A ground fault is an unintended electrical path between a part or component of a device, operating at some electrical potential with respect to ground, and ground. Electrical ground is commonly associated with earth. For example, ground fault may occur when a hot wire comes into contact with a ground wire or a grounded portion of a junction box or a grounded portion of an appliance or electrical device. That is, a ground fault occurs when electrical current flows along an unintended path to ground. To protect against ground faults, ground fault protection devices may be utilized to detect ground fault currents and, when detected, trigger an open circuit in that circuit for interrupting the undesirable fault current.

Circuit protection devices may include ground fault circuit interrupter (GFCI) devices, arc fault circuit interrupter (AFCI) devices, or combination arc-fault circuit interrupter (CAFI) devices. GFCI devices, for example, may be configured to protect an electrical device or an electrical branch circuit by interrupting electrical current that (1) may be high enough to damage the electrical device or the electrical branch circuit; but (2) may be less than the level that would trigger an over current interruption device (e.g., electrical circuit breaker). However, ground fault protection devices are commonly designed to operate on single circuit or single device.

Common electrical safety codes may require ground fault protection devices to be installed at specified locations of a residential property. For example, the Canadian Electrical Code requires that GFCI devices be provided to protect all electrical receptacles located within 1.5 meters of a sink, or that electrical equipment located within confines of a swimming pool or within 3 meters of spas and hot tubs be protected with GFCI devices. To protect every electrical circuit or device feeding from an electrical service panel within a residential home, it may be desirable to install a ground fault protection device at every electrical receptacle for each electrical device feeding from the electrical service panel. The cost of protecting every receptacle within a residential property with existing protection devices may be prohibitively high. Accordingly, it may be advantageous to monitor for ground faults at an electrical service panel of a residential home. Monitoring ground faults at the electrical service panel may allow simultaneous and central monitoring of each electrical circuit feeding from the electrical service panel. Early detection of ground faults may allow a building owner to proactively investigate and mitigate ground faults, thereby reducing the risk of electrical malfunctions or fires.

Figure 1:
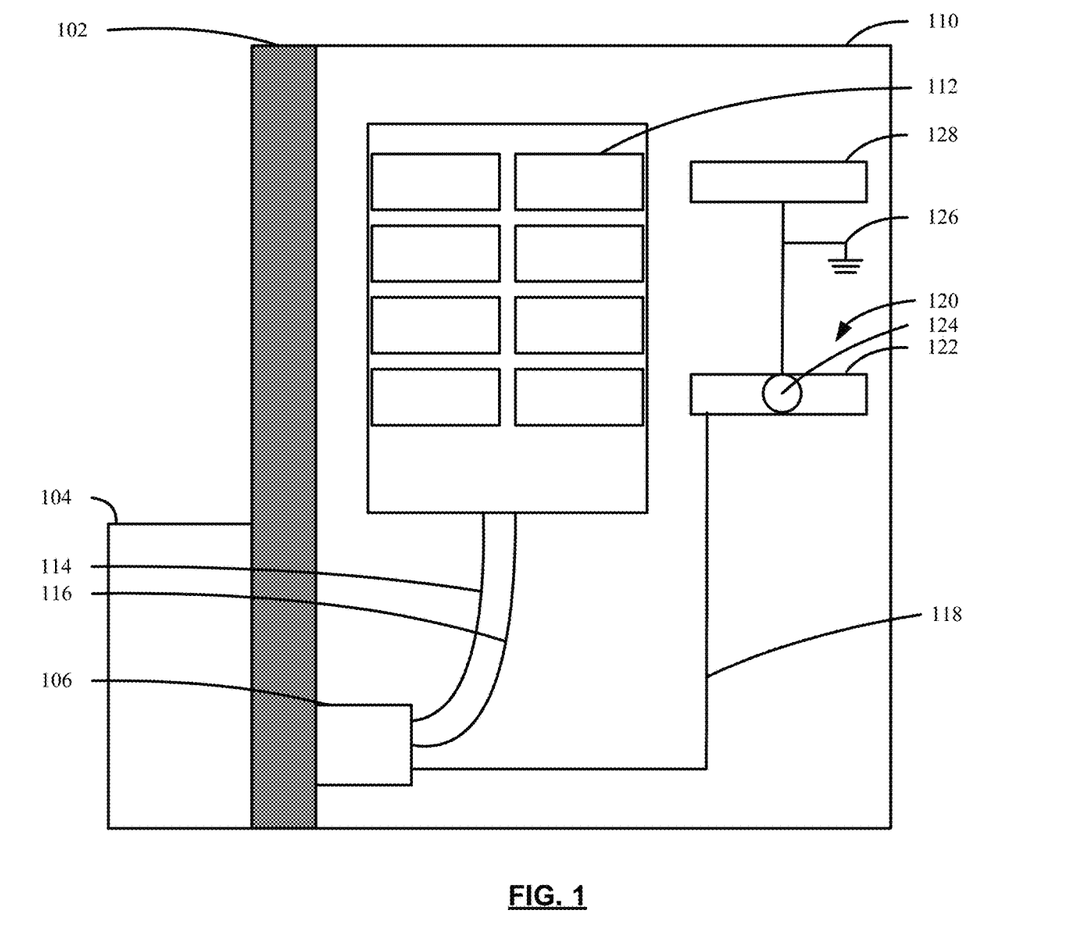
FIG. 1 is a block diagram of an electrical service panel for a building, in accordance with an embodiment of the present application.

Reference is now made to FIG. 1, which illustrates a block diagram of an electrical service panel 110 for a building. The electrical service panel 110 may be mounted against an interior side of a wall 102 and that is adjacent an electricity meter 104 that may be mounted against an exterior side of the wall 102. The electricity meter 104 may be provided by a local electricity distribution company for metering electricity consumed by the building.

Electricity may be provided to the building using a three-wire, single-phase configuration. The electricity meter 104 may be coupled to the electrical service panel 110 by a first hot wire 114, a second hot wire 116, and a neutral wire 118 via a conduit 106. Although electricity may be provided to a building using a three-wire, single phase configuration, in some embodiments, electricity may be provided to the building using a three-phase configuration or any other wire/phase configuration.

In some embodiments, the electrical service panel 110 may include an array of circuit breakers 112. In some other embodiments, the electrical service panel 110 may include an array of protection fuses. The array of circuit breakers 112 may be configured to switch current flow from the first hot wire 114 and the second hot wire 116 to a plurality of areas throughout the building. Each circuit breaker may be configured to interrupt current flow when a detected current flow exceeds a predetermined safe amount of current flow flowing through that circuit breaker.

The electrical service panel 110 may also include a neutral bus bar 122 and a grounding electrode conductor 126. The neutral bus bar 122 may be a point where neutral connections from respective electrical circuits feeding from the electrical service panel 110 are connected. The grounding electrode conductor 126 may provide the electrical service panel 110 with a connection to the earth. The neutral wire 118 from the electricity distribution company may be connected to the neutral bus bar 122.

The electrical service panel 110 may be subject to electrical codes of the country or region in which the electrical service panel 110 is installed. For example, electrical codes may require that the grounding electrode conductor 126 be connected to the metal enclosure of the electrical service panel 110. Electrical codes may also require that the grounding electrode conductor 126 be connected to an equipment grounding terminal bar 128 within the electrical service panel 110. The equipment grounding terminal bar 128 may be for coupling a plurality of ground connectors, for example from electrical circuits feeding from the electrical service panel 110, to the grounding electrode conductor 126.

The electrical service panel 110 may also include a primary bonding location 120 for connecting the neutral bus bar 122 to the grounding electrode conductor 126. In some embodiments, a main bonding jumper 124 may be installed at the primary bonding location 120. The main bonding jumper 124 may be a wire, a screw, or any other similar conductor. In FIG. 1, the main bonding jumper 124 is illustrated as a screw and enables electrical contact or connection between the neutral bus bar 122 and the grounding electrode conductor 126. Accordingly, the main bonding jumper 124 may couple the neutral bus bar 122 to the grounding electrode conductor 126. The main bonding jumper 124 may be fixed in a small space within the electrical service panel 110. Upon installation of the electrical service panel 110, the main bonding jumper 124 may no longer be configured by the building owner or electrician. Although the main bonding jumper 124 in FIG. 1 is provided as a screw, in some embodiments, the main bonding jumper may be a conducting wire, or any other device, for connecting the neutral bus bar 122 to the grounding electrode conductor 126.

As described herein, it may be desirable to monitor for ground faults at the electrical service panel 110, such that the array of electrical circuits feeding from the electrical service panel may be monitored for ground faults simultaneously and centrally at the electrical service panel.

Figure 2:
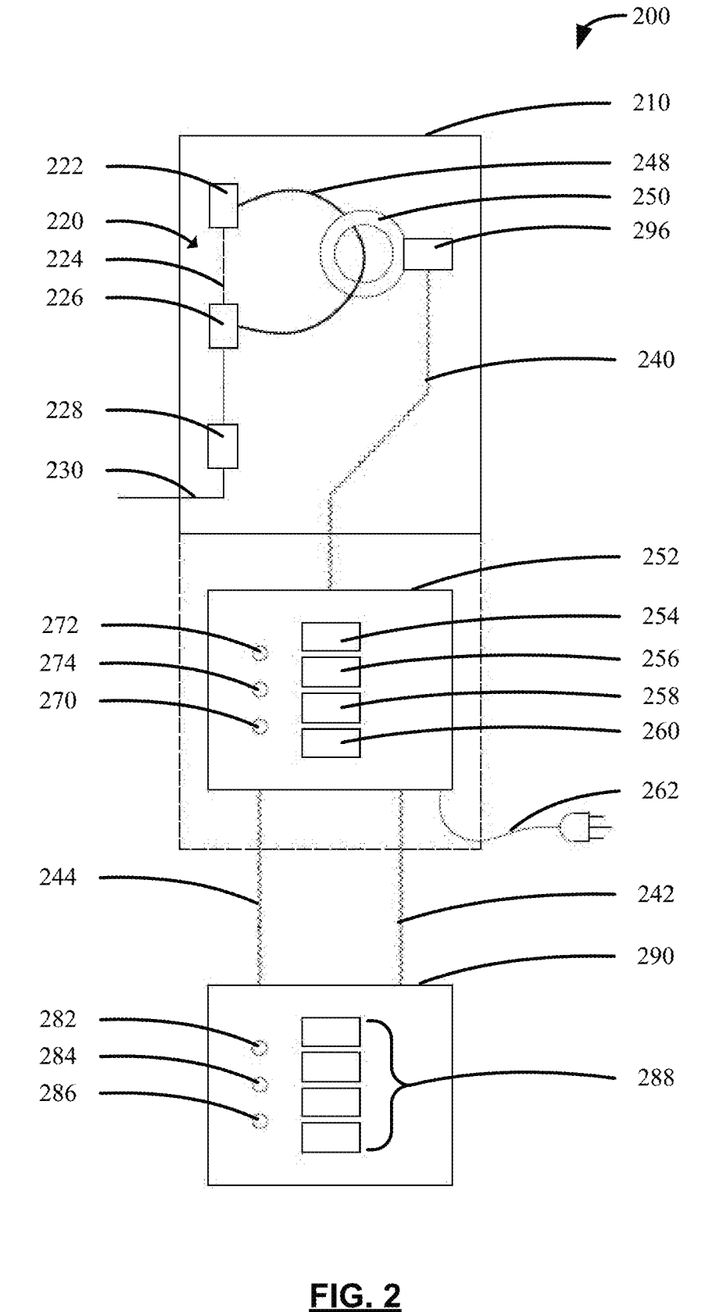
FIG. 2 is a block diagram of a ground fault monitoring system installed at an electrical service panel, in accordance with an embodiment of the present application.

Reference is now made to FIG. 2, which is block diagram illustrating a ground fault monitoring system 200 installed in an electrical service panel 210, in accordance with an embodiment of the present application. The ground fault monitoring system 200 may be configured for the electrical service panel 210 of a building. The electrical service panel 210 may include a main bonding jumper 224 at the primary bonding location 220. As illustrated in FIG. 2, in some embodiments, the main bonding jumper may be a wire conductor configured to provide a low impedance path between a neutral bus 222 and a grounding electrode conductor 226. The main bonding jumper 224 may be a short wire conductor, and upon installation of the electrical service panel 210, the main bonding jumper may not be intended to be configurable by the building owner or electrician.

The electrical service panel 210 may include a ground bus 228 for coupling a plurality of ground connectors 230, for example, from electrical circuits feeding from the electrical service panel 110, to the grounding electrode conductor 226.

The ground fault monitoring system 200 may include a current transformer 250 coupled to the primary bonding location 220 of the electrical service panel 210. As described, the main bonding jumper 224 at the primary bonding location 220 may be a short wire conductor, and it may be impractical to couple the current transformer 250 to the main bonding jumper, such that the current transformer 250 can detect current flow through the main bonding jumper. Accordingly, in some embodiments, the main bonding jumper 224 may be removed from the primary bonding location 220 and replaced with an auxiliary bonding jumper 248. The auxiliary bonding jumper 248 may provide a low impedance path between the neutral bus 222 and the grounding electrode conductor 226 of the electrical service panel 210. Further, the auxiliary bonding jumper 248 may be a wire conductor that has a greater length than the main bonding jumper 224. Accordingly, the ground fault monitoring system 200 may include an auxiliary bonding jumper 248 passing through the current transformer 250 at the primary bonding location 220 of the electrical service panel 210. In response to detecting current flowing through the auxiliary bonding jumper 248, the current transformer 250 may produce current transformer signals indicative of the amount of current flowing through the auxiliary bonding jumper 248. In some embodiments, the current transformer 250 may include a data processor 296 for receiving signals indicating detection of current flow through the auxiliary bonding jumper 248 and for generating current transformer signals for sending to current monitoring devices.

In some embodiments, the auxiliary bonding jumper 248 may be configured within the electrical service panel 210. That is, the auxiliary bonding jumper 248 may not extend to any exterior portion of the electrical service panel 210. The auxiliary bonding jumper 248 may be selected according to the electrical capabilities of the electrical service panel 210. For example, if the electrical service panel 210 is rated for 100 Amps, the auxiliary bonding jumper 248 may be a #8 gauge wire. If the electrical service panel 210 is rated for 200 Amps, the auxiliary bonding jumper 248 may be a #6 gauge wire. If the electrical service panel 210 is rated for 400 Amps, the auxiliary bonding jumper 248 may be a #4 gauge wire.

The ground fault monitoring system 200 may include a current monitoring device 252 in communication with the current transformer 250 to detect electrical current flowing through the auxiliary bonding jumper 248. The current monitoring device 252 may be coupled to the current transformer 250 via a measurement link 240. In some embodiments, the measurement link 240 may be a physical wire connection. In some other embodiments, the current transformer 250 and the current monitoring device 252 may each include a wireless transceiver, and the measurement link 240 between the current transformer 250 and the current monitoring device 252 may be a wireless link.

Because the auxiliary bonding jumper 248 couples the neutral bus 222 and the grounding electrode conductor 226, when the auxiliary bonding jumper 248 is passed through the current transformer 250 at the primary bonding location 220, the current transformer 250 may detect current flowing through the auxiliary bonding jumper 248. Any detected current flowing through the auxiliary bonding jumper 248 may be indicative of ground fault electrical current returning to the electrical service panel 210.

It may be possible to couple the current transformer 250 of the ground fault monitoring system 200 to other parts of the electrical service panel 210 for detecting ground faults. For example, the current transformer 250 may be coupled around the first hot wire 114, the second hot wire 116, and the neutral wire 118 ("alternate measurement method A"). It may also be possible to couple the current transformer 250 around a wire pair including a hot wire and a neutral wire connected to an individual electrical device feeding from the electrical service panel 210. As current transformers may be available in a variety of sizes and types, and it may be inefficient or cost prohibitive to utilize a current transformer with an amperage rating that is, for example, several magnitudes larger than the expected current through a conductor being monitored or where the physical inner diameter of the current transformer is magnitudes larger than a diameter of the conductive wire being monitored.

For example, current transformers may be available in a number of different physical sizes, where a specific current transformer may be chosen such that the inner diameter of that current transformer is large enough to fit around conductive wires to be monitored. Further, current transformers may be available in a number of amperage ratings. For example, a specific current transformer may be chosen such that the amount of current passing through a conductive wire being monitored may not be greater than the amperage rating of that current transformer. However, the cost of a current transformer may be proportional to the physical size and amperage rating of that current transformer.

It may not be cost effective for a ground fault monitoring system to include a large current transformer with a high amperage rating. Accordingly, it may be advantageous for a ground fault monitoring system to include a current transformer that may be sized and selected for detecting current flowing through an auxiliary bonding jumper 248 (FIG. 2) because the expected current flowing through the auxiliary bonding jumper 248 (e.g., low impedance path between a neutral bus 222 and ground electrode conductor 226) may be multitudes smaller as compared to the total current flowing through the wire conductors to be monitored by the "alternate measurement method A", described above.

Referring still to FIG. 2, the current monitoring device 252 may include a monitoring circuit 254. The monitoring circuit 254 may receive current transformer signals generated by the current transformer 250. The monitoring circuit 254 may process the received current transformer signals and provide a ground fault status signal that is proportional to or is indicative of a ground fault status of the electrical service panel 210. In some embodiments, the monitoring circuit 254 may be an integrated circuit, such as a ground fault interrupter integrated circuit sold as a system-on-chip device.

In some embodiments, the current monitoring device 252, including the monitoring circuit 254, may be configured with a plurality of ground fault threshold levels. The ground fault threshold levels may be configurable. For example, the current monitoring device may be configured with current measurement values associated with a warning threshold level and an alarm threshold level. The warning threshold level may be less than the alarm threshold level. If the current monitoring device 252 determines that the current flowing through the auxiliary bonding jumper 248 is less than a current measurement value associated with the warning threshold level, the current monitoring device 252 may generate a ground fault status signal that indicates a "normal status".

If the current monitoring device 252 determines that the current flowing through the auxiliary bonding jumper 248 is greater than a current measurement value associated with a warning threshold level, but is less than the alarm threshold level, the current monitoring device 252 may generate a ground fault status signal that indicates a "warning status". The "warning status" may indicate that there may be some electrical current flowing along an unintended path to ground. The "warning status" may provide the building owner or electrician with an indication that it may be necessary to investigate the cause of a potential ground fault.

If the current monitoring device 252 determines that the current flowing through the auxiliary bonding jumper 248 is greater than a current measurement value associated with the alarm threshold level, the current monitoring device 252 may generate a ground fault status signal that indicates an "alarm status". The "alarm status" may indicate that there is electrical current flowing along an unintended path to ground, and that the building owner or electrician ought to investigate the cause of the potential ground fault. For example, the "alarm status" may be triggered when an electrical load device may be incorrectly installed or wired to the electrical service panel, and a hot wire may inadvertently been connected to or touching a metal enclosure of an electrical appliance.

In some embodiments, the current monitoring device 252 may be programmable, such that the ground fault status threshold levels may be programmed according to recommendations or requirements of local electrical code standards for buildings. In one example, the current monitoring device 252 may be programmed to indicate a "normal" status (e.g., normal indicator) when the detected current flowing through the auxiliary bonding jumper 248 is less than 3 mA. Further, the current monitoring device 252 may be programmed to indicate a "warning" status (e.g., warning indicator) when the detected current flowing through the auxiliary bonding jumper 248 is between 3 mA and 5 mA. Further, the current monitoring device 252 may be programmed to indicate an "alarm" status (e.g., alarm indicator) when the detected current flowing through the auxiliary bonding jumper 248 is greater than 5 mA.

Although the foregoing description provides a normal, warning, and alarm status, the current monitoring device 252 may be configured with any number of statuses or levels for adapting to a required level of ground fault status granularity for the electrical service panel 210.

Further, the ground fault threshold levels may be configurable according to the type of electrical circuits feeding from the electrical service panel. For example, in some configurations of electrical circuits feeding from the electrical service panel 210, normal leakage current may range from about 10 mA to 100 mA. In this example, the warning threshold level may be setup to be 150 mA and the alarm threshold level may be setup to be 300 mA. As will be described, the current monitoring device 252 may include user interface elements allowing the building owner or electrician to setup the warning threshold level and the alarm threshold level according to design characteristic of electrical circuits feeding from the electrical service panel.

Thus, the current monitoring device 252 may be configured to detect current flow through the auxiliary bonding jumper 248. For example, the current transformer 250 may produce current transformer signals indicative of the amount of current flowing through the auxiliary bonding jumper 248, and the current monitoring device 252, including the monitoring circuit 254, may receive the current transformer signals and determine a current reading of the current flowing through the auxiliary bonding jumper 248. The current monitoring device 252 may compare a ground fault threshold level with the determined current reading, and based on the comparison, transmit a ground fault level indicator to a ground fault output interface 256 for providing a ground fault status of the electrical service panel.

In some embodiments, the ground fault output interface 256 may be a display screen integral to the current monitoring device 252. The display screen may provide the ground fault status in a textual form. In some embodiments, the ground fault output interface 256 may include a series of indicator light emitting diodes (LEDs) associated with one or more ground fault status. For example, the series of LEDs may include a "normal" LED that illuminates when the detected amount of current flowing through the auxiliary bonding jumper 248 is less than a warning threshold level. The series of indicator LEDs may also include a "warning" LED that illuminates when the detected amount of current flowing through the auxiliary bonding jumper 248 is greater than the warning threshold level, but less than an alarm threshold level. The series of indicator LEDs may also include an "alarm" LED that illuminates when the detected amount of current flowing through the auxiliary bonding jumper 248 is greater than the alarm threshold level. Each of the LED indicators may be implemented as different coloured LEDs. Accordingly, the current monitoring device 252 may be configured to continuously generate or provide a ground fault status signal in real-time when the current reading of the current flowing through the auxiliary bonding jumper 248 reaches one of the ground fault threshold levels for generating a visual alarm. The visual alarm can include illumination of at least one of a normal LED indicator, a warning LED indicator, or an alarm LED indicator.

In some embodiments, the current monitoring device 252 may be configured to generate a ground fault status signal when the current reading of the current flowing through the auxiliary bonding jumper 248 reaches one of the ground fault threshold levels for generating an audible alarm. For example, the current monitoring device 252 may include an audio output device 270, such as a speaker, for providing an audible alarm. The audible alarm can include an audible noise, such as a horn or siren, being emitted by the audio output device 270. In some embodiments, the audible alarm may be implemented in 60 second cycles. For example, once the audible alarm is triggered, the audible alarm may sound for 60 seconds, and subsequently silence for 60 seconds before sounding again for 60 seconds.

In some embodiments, the current monitoring device 252 may include one or more interface elements, such as a first input button 272 and a second input button 274. For example, the first input button 272 and the second input button 274 may allow the building owner or electrician to configure the current monitoring device 252 with desired ground fault threshold levels. In some embodiments, one of the interface elements, such as the first input button 272 may be used by the building owner or electrician for silencing an audible alarm once a ground fault threshold level has been reached and an audible alarm has been triggered. For example, the current monitoring device 252 may include a "silence" button for temporarily silencing the audible alarm for a fixed duration of time. In some embodiments, the audible alarm may cease to sound when the current flowing through the auxiliary bonding jumper 248 reaches a threshold level, such that an audible alarm may not be merited. Accordingly, the current monitoring device 252 may include the one or more interface elements allowing the building owner or electrician to setup the current monitoring device 252 or to interact with the current monitoring device 252.

In some embodiments, the current monitoring device 252 may include a power interface circuit 260. The current monitoring device 252 may include a power interface circuit 260 for connecting to an electrical power source or a portable battery power source. For example, the power interface circuit 260 may include an alternating current (AC) power interface for connecting the current monitoring device 252 to an electricity receptacle (illustrated with a cord 262) feeding from the electrical service panel. In some other examples, the power interface circuit 260 may include a direct current (DC) power interface for connecting the current monitoring device 252 to a portable battery power source, such as a battery pack. If the power interface circuit 260 includes a DC power interface and a portable power source is connected to the current monitoring device 252, the current monitoring device 252 may be a portable device and/or may be powered to function in the event that the AC power interface malfunctions or the electricity receptacle providing electricity to the AC power interface becomes unavailable.

As the current monitoring device 252 may include a power interface circuit 260 having an AC power interface and a DC power interface, the current monitoring device 252 may be configured to detect an alternating current (AC) disconnection of the electricity receptacle from the current monitoring device 252. When the AC disconnection is detected, the current monitoring device 252 may be configured to transmit an alternating current power indicator to the ground fault output interface 256 for conveying a power error status, and enable the DC power interface for providing power to the current monitoring device 252 using a portable power source.

In some embodiments, the current monitoring device 252 may also include a memory device 258 for recording ground fault electrical current values over time. For example, when the monitoring circuit 254 receives current transformer signals generated by the current transformer 250, the current monitoring device 252 may be configured to record the current transformer signals in the memory device 258 over time. The current transformer signals, which may correspond to ground fault electrical current values, may be stored or processed for generating a historical log of ground fault current returning to the electrical service panel 210. In some embodiments, the current monitoring device 252 may be configured to track the historical log of ground fault current and generate a ground fault status if a change in ground fault current has been sustained for a predetermined amount of time. For example, if the current monitoring device 252 may be configured to generate a ground fault status signal when the ground fault current is above a threshold level for a minimum number of ground fault current readings to prevent outlier ground fault current readings from triggering an alarm. An outlier ground fault current reading may, for example, be a current spike.

As described in the foregoing description, the current monitoring device 252 may be in communication with the current transformer 250 to detect ground fault electrical current returning to the electrical service panel 210. In some embodiments, the current monitoring device 252 may be mounted within the electrical service panel 210 and the current monitoring device 252 may be utilized as a monitoring or diagnostic tool for the building owner or electrician for proactively monitoring for ground faults in electrical circuits feeding from the electrical service panel 210.

In some use case scenarios, it may not be convenient for the building owner or electrician to continually open up the electrical service panel 210 for monitoring electrical circuits feeding from the electrical service panel 210 for ground faults. Thus, in some embodiments, the ground fault monitoring system 200 may include an auxiliary device 290 in communication with the current monitoring device 252 via an auxiliary connection link 242. In some embodiments, the current monitoring device 252 and the auxiliary device 290 may include a wireless data communication interface, and the auxiliary connection link 242 may be a wireless data link. Accordingly, the auxiliary device 290 may be configured to provide a ground fault status to the building owner or electrician at a location that is remote from the current monitoring device 252. For example, the building owner or electrician may not need to physically open up the electrical service panel 210 when they need to check the ground fault status of electrical circuits feeding from the electrical service panel 210. The building owner or electrician may be in other parts of the building or in another geographical location remote from the building and may conveniently access the ground fault status of the electrical service panel 210 of that building. For example, the auxiliary device 290 may be configured to receive a generated ground fault status signal from the current monitoring device 252 via the auxiliary connection link 242 and generate at least one of an audible alarm or visual alarm in response to the received ground fault status signal.

In some embodiments, the auxiliary connection link 242 may be a wired connection. For example, the auxiliary connection link 242 may be an Ethernet cable connection, or any other transmission line for conveying signals from a first location to a second location. When the auxiliary connection link 242 is a wired connection, in some embodiments, the auxiliary device 290 may also include an auxiliary power connection 244. The current monitoring device 252 may provide electrical power to the auxiliary device 290.

In some embodiments, the auxiliary device 290 may be configured to allow the building owner or electrician to remotely control the current monitoring device 252 via the auxiliary connection link 242. The auxiliary device 290 may include one or more interface elements, such as a first interface element 282 and a second interface element 284, for generating and/or transmitting a system control signal to the current monitoring device 252. For example, the first interface element 282 and the second interface element 284 may allow the building owner or electrician, from a location that is remote from the current monitoring device 252, to configure the current monitoring device 252 with the desired ground fault threshold levels. In another example, the first interface element 282 may be used by the building owner or electrician for silencing an audible alarm or re-setting a visual alarm once a ground fault threshold level has been reached. Accordingly, the first interface element 282 and the second interface element 284 may allow the building owner or electrician to configure or initialize the current monitoring device 252 or to interact with the current monitoring device 252 at a location that is remote from the current monitoring device 252.

The auxiliary device 290 may include one or more auxiliary output interface elements 288 for providing a ground fault status of the electrical service panel 210 to the building owner or electrician. The auxiliary output interface elements 288 may include a display screen, such as a liquid crystal display screen (LCD display), to provide the ground fault status in textual form. The auxiliary output interface elements 288 may also include one or more indicator light emitting diodes (LEDs) associated with one or more ground fault status. For example, a series of LEDs may include a "normal" LED that illuminates when the detected amount of current flowing through the auxiliary bonding jumper 248 is less than the warning threshold level. The series of LEDs may also include a "warning" LED that illuminates when the detected amount of current flowing through the auxiliary bonding jumper 248 is greater than the warning threshold level, but less than the alarm threshold level. The series of LEDs may also include an "alarm" LED that illuminates when the detected amount of current flowing through the auxiliary bonding jumper 248 is greater than the alarm threshold level. The series of LEDs providing ground fault status may mirror or correspond the ground fault status being provided by the ground fault output interface 256 of the current monitoring device 252.

The auxiliary device 290 may also include an auxiliary audio output device 286, such as a speaker, for providing an audible alarm. In some embodiments, the output of the auxiliary audio output device 286 may correspond to the ground fault status being provided by the audio output device 270 of the current monitoring device 252. That is, when the audio output device 270 emits an audible alarm at the current monitoring device 252, the auxiliary audio output device 286 may also emit an audible alarm at the auxiliary device 290.

Figure 3:
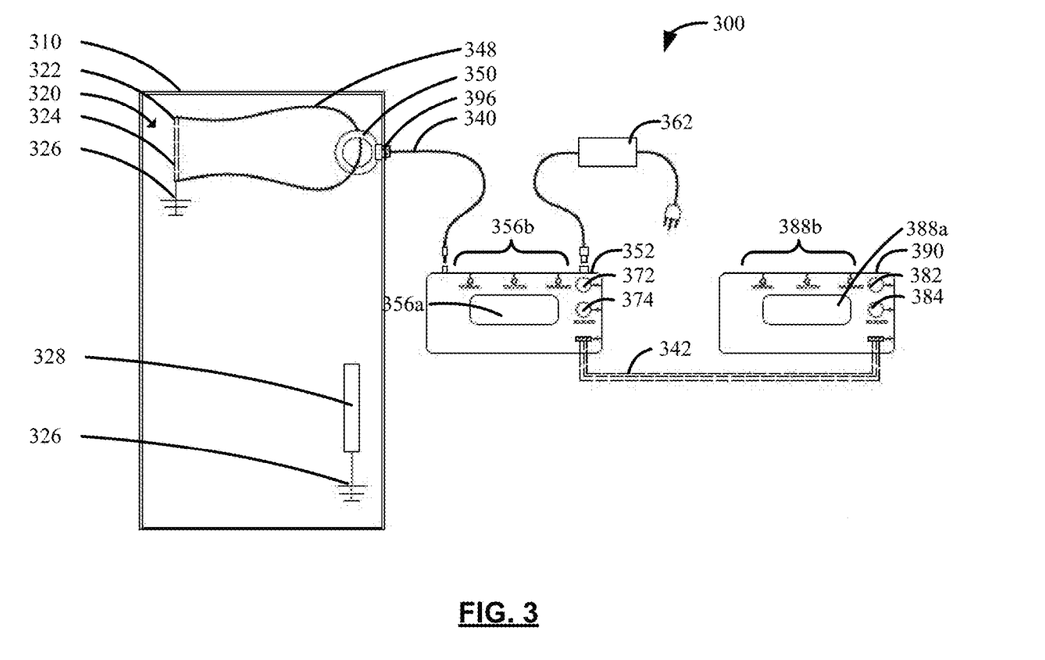
FIG. 3 is a schematic diagram illustrating a ground fault monitoring system installed at an electrical service panel, in accordance with an embodiment of the present application.

Reference is now made to FIG. 3, which is a schematic diagram illustrating a ground fault monitoring system 300 installed in an electrical service panel 310, in accordance with an embodiment of the present application. The ground fault monitoring system 300 for the electrical service panel 310 may include a current transformer 350 coupled to a primary bonding location 320 of the electrical service panel 310. The main bonding jumper 324 may be replaced with an auxiliary bonding jumper 348 for providing a low-impedance path between a neutral bus 322 and a grounding electrode conductor 326 of the electrical service panel. Further, the auxiliary bonding jumper 348 may be passed through the current transformer 350, and the current transformer 350 may be configured to detect ground fault electrical current returning to the electrical service panel 310. Further, the electrical service panel 310 may also include an equipment grounding terminal bar 328 coupled to the grounding electrode conductor 326.

The ground fault monitoring system 300 may include a current monitoring device 352 in communication with the current transformer 350 to detect ground fault electrical current returning to the electrical service panel. The current monitoring device 352 may be coupled to the current transformer 350 via a measurement link 340. In FIG. 3, the measurement link 340 may be a physical wire connection. For example, the measurement link 340 may include a coaxial cable, or any other type of cable for coupling the current transformer 350 to the current monitoring device 352. The ground fault monitoring system 300 may include a ground fault output interface in communication with the current monitoring device 352 to provide ground fault status of the electrical service panel 310. In FIG. 3, the ground fault output interface may include an LCD display 356a and a series of LED indicators 356b. In FIG. 3, the current monitoring device 352 may also include a first input button 372 and a second input button 374. The input buttons may function similar to the one or more interface elements described with reference to FIG. 2.

Further, the current monitoring device 352 may include a power interface circuit for connecting an electrical power source or a portable battery power source to the current monitoring device 352. For example, as illustrated in FIG. 3, an electrical power cord and/or electrical power circuitry 362 may be provided for connecting the current monitoring device 352 to an electricity receptacle for providing electrical power to the current monitoring device 352.

As illustrated in FIG. 3, the current transformer 350 may be coupled to the primary bonding location 320 from within the electrical service panel 310. Further, the current monitoring device 352 may be positioned external to the electrical service panel 310 and may be removeably connected to the current transformer 350 through a current transformer connection interface 396. In some embodiments, the current transformer connection interface 396 may be an electrical threaded nipple. For example, the current transformer connection interface 396 may include a common ½" electrical threaded nipple, and the measurement link 340 may be configured to couple the current monitoring device 352 with the current transformer 350.

The current transformer connection interface 396 may be positioned on an accessible surface of the electrical service panel 310, and the current transformer 350 may be coupled to the current transformer connection interface 396, such that a measurement link 340 may couple a current monitoring device 352 that is positioned external to the electrical service panel 310 to the current transformer 350. In FIG. 3, because the current monitoring device 352 is positioned external to the electrical service panel 310 and because the current monitoring device 352 may be removeably connected to the current transformer 350 through the electrical threaded nipple, the building owner or electrician may be able to utilize the current monitoring device 352 as a portable tool for checking ground fault status of two or more service panels, where the two or more service panels may each be configured with an auxiliary bonding jumper passing through a current transformer at a current transformer connection interface. Thus, components of the ground fault monitoring system 300 may be configured as modules, offering the building owners or electrician flexibility when monitoring ground fault status among two or more electrical service panels.

When the current monitoring device 352 is positioned external to the electrical service panel 310 and removeably connected to the current transformer 350 through the threaded electrical nipple, the current monitoring device 352 may be configured to detect whether the measurement link 340 is correctly setup. In some embodiments, the current monitoring device 352 may be configured to detect a measurement link disconnection between the current monitoring device 352 and the current transformer 350. When the measurement link disconnection is detected, the current monitoring device 352 may be configured to transmit a current transformer disconnection indicator to the ground fault output interface for conveying a measurement link status. For example, if the measurement link 340 is inadvertently severed or is degraded, the current monitoring device 352 may provide a "measurement link failure" message on the LCD display 356a, such that the building owner or electrician can remedy the faulty or broken link. Providing an indication of "measurement link failure" may notify the building owner or electrician that an accurate ground fault status cannot be provided at the current time. The building owner or electrician may investigate the cause of the "measurement link failure" and remedy issues with the measurement link 340.

In some embodiments, the ground fault monitoring system 300 may optionally include an auxiliary device 390. The auxiliary device 390 may include one or more interface elements, such as a first input interface element 382 and a second input interface element 384 for generating and/or transmitting system control signals to the current monitoring device 352.

In some embodiments, the auxiliary device 390 may include one or more auxiliary output interface elements, such as an LCD display 388a and a series of LED indicators 388b. The output provided at the LCD display 388a or a series of LED indicators 388b that may correspond to the output at the current monitoring device 352, such that the building owner or electrician may monitor the ground fault status of the electrical service panel 310 from a location that is remote to the electrical service panel 310 and/or that is remote to the current monitoring device 352.

In some embodiments, the auxiliary device 390 may be in communication with the current monitoring device 352 via an auxiliary connection link 342. In some embodiments, the current monitoring device 352 and the auxiliary device 390 may include a wireless data communication interface, and the auxiliary connection link 342 may be a wireless data link. In some embodiments, the auxiliary connection link 342 may be a wireless local area networking link. In some embodiments, the auxiliary connection link 342 may be a wired connection.

In some embodiments, the auxiliary device 390 may be a mobile or cellular device adapted to receive status signals from the current monitoring device 352, such that the mobile or cellular device may access a ground fault status when the mobile or cellular device is at a location that is remote from the electrical service panel 310.

Based on the features described herein, in some embodiments, the current monitoring device 352 may be mounted external to, and near to, the electrical service panel 310. In one example, the measurement link 340 may be a physical wire connection, and the wire may be approximately two or three feet in length. Further, the auxiliary device 390 may be a portable device, in communication with the current monitoring device 352 via a wireless link. Accordingly, the auxiliary device 390 may be at a location that is remote from the electrical service panel 310 and may function analogous to a programmable thermostat for a residential heating, ventilation and air conditioning (HVAC) system and be mountable in a living space of a residential home.

The foregoing description provides examples of ground fault monitoring systems for electrical service panels. As illustrated in FIG. 3, a ground fault monitoring system 300 may include modular components, such as the current transformer 350, the current monitoring device 352, and the auxiliary device 390. In some embodiments, an electrical service panel 310 may be manufactured and assembled with a current transformer 350 at a current transformer connection interface 396 (e.g., threaded electrical nipple) on a user accessible surface of the electrical service panel for removeably connecting a current monitoring device 352 to the current transformer 350 via the current transformer connection interface 396.

For buildings with existing electrical service panels, it may be advantageous to retrofit the existing electrical service panels for detecting ground fault electrical current when utilizing a ground fault monitoring system as described in the present disclosure. For example, it may be advantageous to retrofit an existing electrical service panel for interfacing with the modular components, such as the current monitoring device 352, for detecting ground fault electrical current returning to the electrical service panel.

Figure 4:
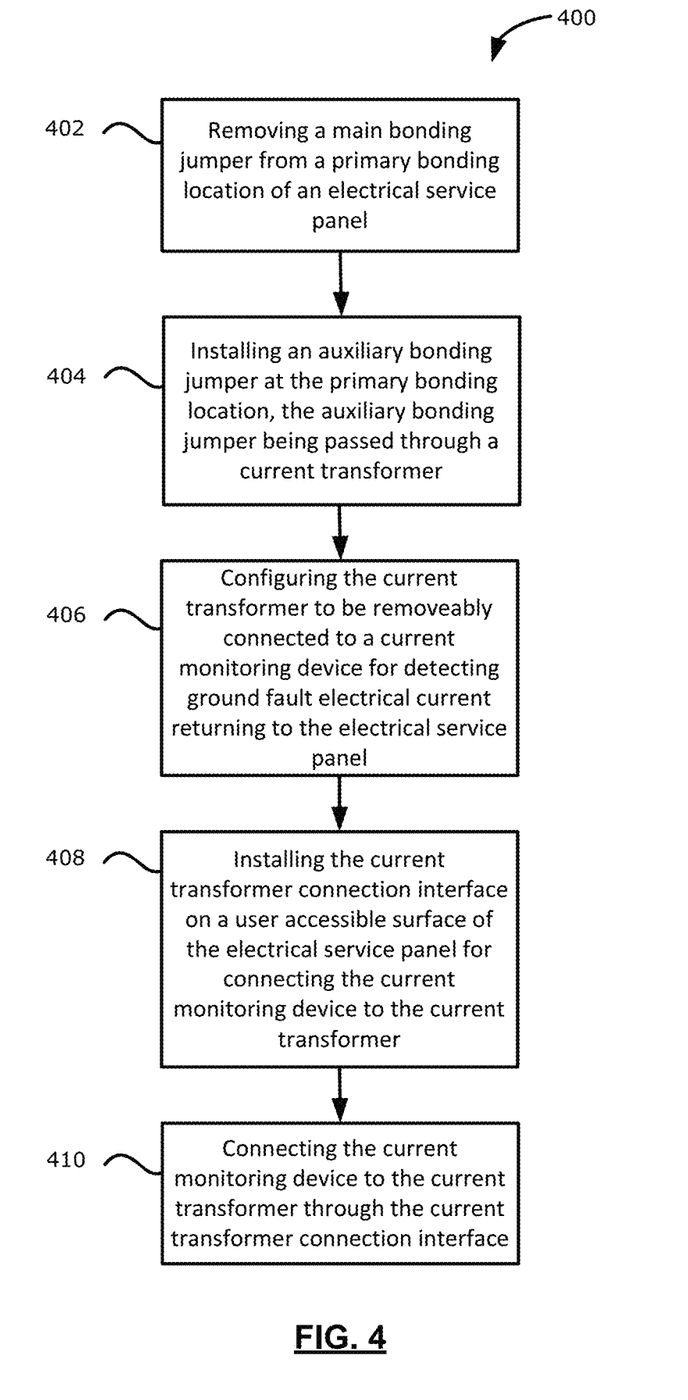
FIG. 4 is a flow chart of a method of retrofitting an electrical service panel to detect ground fault electrical current, in accordance with an embodiment of the present application.

Reference is now made to FIG. 4, which illustrates a flow chart of a method 400 of retrofitting an electrical service panel to detect ground fault electrical current, in accordance with an embodiment of the present application.

At 402, the method may include removing a main bonding jumper from a primary bonding location of the electrical service panel. Removing the main bonding jumper may isolate a neutral bus from a grounding electrode conductor of the electrical service panel.

At 404, the method may include installing an auxiliary bonding jumper at the primary bonding location to provide a low-impedance path between the neutral bus and the grounding electrode conductor of the electrical service panel. The auxiliary bonding jumper may be passed through a current transformer positioned within the electrical service panel.

As described in an example of the present disclosure, in one embodiment, the main bonding jumper may be an electrically conducting screw for connecting the neutral bus to the grounding electrode conductor of the electrical service panel. However, it may be challenging to couple the current transformer to the main bonding jumper screw for detecting ground fault electrical current returning to the electrical service panel. Accordingly, the auxiliary bonding jumper may be installed for replacing the main bonding jumper at the primary bonding location of the electrical service panel. In some embodiments, the auxiliary bonding jumper may be a conducting wire and may be passed through the current transformer that is positioned within the electrical service panel. Accordingly, when the auxiliary bonding jumper is passed through the current transformer, a current monitoring device that is in communication with the current transformer may detect ground fault electrical current returning to the electrical service panel.

At 406, the method may include configuring the current transformer to be removeably connected to the current monitoring device for detecting ground fault electrical current returning to the electrical service panel.

At 408, the method may include installing a current transformer connection interface on a user accessible surface of the electrical service panel for removeably connecting the current monitoring device to the current transformer via the current transformer connection interface. For example, the current transformer connection interface 396 (FIG. 3) may be a threaded electrical nipple.

At 410, the method may include connecting a current monitoring device to the current transformer through the current transformer connection interface. Further, in some embodiments, the method can further include connecting an auxiliary device to the current monitoring device through an auxiliary connection link. The auxiliary device is configured to provide ground fault status based on a ground fault status signal received from the current monitoring device.

Although the exemplary embodiments described herein are described for an electrical service panel for a building, such as a residential home, the ground fault monitoring system may be configured for any location requiring ground faults to be monitored at an electrical service panel. The ground fault monitoring system may be configured to detect current at an auxiliary bonding jumper of a primary bonding location for a three-phase electrical service panel, or an electrical service panel having any number of phases or wiring configurations.

Certain adaptations and modifications of the described embodiments can be made. Therefore, the above discussed embodiments are considered to be illustrative and not restrictive.

What is claimed is:

1. A ground fault monitoring system for an electrical service panel, the ground fault monitoring system comprising:
   a current transformer coupled to a primary bonding location of the electrical service panel;
   a current monitoring device in communication with the current transformer to detect ground fault electrical current returning to the electrical service panel;
   a ground fault output interface in communication with the current monitoring device to provide ground fault status of the electrical service panel; and
   an auxiliary bonding jumper passing through the current transformer at the primary bonding location of the electrical service panel, the auxiliary bonding jumper providing a low-impedance path between a neutral bus and a grounding electrode conductor of the electrical service panel, wherein the auxiliary bonding jumper replaces a main bonding jumper at the primary bonding location of the electrical service panel.

2. The ground fault monitoring system of claim 1, wherein the current monitoring device is configured to:

detect current flow through the auxiliary bonding jumper and determine a current reading of the current flowing through the auxiliary bonding jumper;

compare a ground fault threshold level with the determined current reading; and based on the comparison, transmit a ground fault level indicator to the ground fault output interface for providing the ground fault status.

3. The ground fault monitoring system of claim 1, wherein the current monitoring device includes a power interface for connecting at least one of an electrical power source or a portable battery power source.

4. A ground fault monitoring system for an electrical service panel, the ground fault monitoring system comprising:

a current transformer coupled to a primary bonding location of the electrical service panel;

a current monitoring device in communication with the current transformer to detect ground fault electrical current returning to the electrical service panel;

a ground fault output interface in communication with the current monitoring device to provide ground fault status of the electrical service panel; and an auxiliary bonding jumper passing through the current transformer at the primary bonding location of the electrical service panel, the auxiliary bonding jumper providing a low-impedance path between a neutral bus and a grounding electrode conductor of the electrical service panel, wherein the current monitoring device is configured to:

detect current flow through the auxiliary bonding jumper and determine a current reading of the current flowing through the auxiliary bonding jumper;

compare a ground fault threshold level with the determined current reading; and based on the comparison, transmit a ground fault level indicator to the ground fault output interface for providing the ground fault status, and wherein the current monitoring device is configured with a plurality of ground fault threshold levels, and wherein the plurality of ground fault threshold levels are configurable.

5. The ground fault monitoring system of claim 4, wherein the current monitoring device is further configured to:

generate a ground fault status signal when the current reading of the current flowing through the auxiliary bonding jumper reaches one of the plurality of ground fault threshold levels for generating at least one of an audible alarm or a visual alarm.

6. The ground fault monitoring system of claim 5, wherein the visual alarm includes at least one of a normal indicator, a warning indicator, or an alarm indicator.

7. The ground fault monitoring system of claim 5, further comprising an auxiliary device in communication with the current monitoring device via an auxiliary connection link, wherein the auxiliary device is configured to:

receive the generated ground fault status signal; and generate at least one of the audible alarm or the visual alarm in response to the received ground fault status signal.

8. The ground fault monitoring system of claim 7, wherein each of the current monitoring device and the auxiliary device includes a wireless data communication interface, and wherein the auxiliary connection link is a wireless data link.

9. A ground fault monitoring system for an electrical service panel, the ground fault monitoring system comprising:

a current transformer coupled to a primary bonding location of the electrical service panel;

a current monitoring device in communication with the current transformer to detect ground fault electrical current returning to the electrical service panel;

a ground fault output interface in communication with the current monitoring device to provide ground fault status of the electrical service panel; and an auxiliary device in communication with the current monitoring device via an auxiliary connection link for remotely controlling the current monitoring device, wherein the auxiliary device includes at least one user interface element for generating and transmitting a system control signal to the current monitoring device.

10. A ground fault monitoring system for an electrical service panel, the ground fault monitoring system comprising:

a current transformer coupled to a primary bonding location of the electrical service panel;

a current monitoring device in communication with the current transformer to detect ground fault electrical current returning to the electrical service panel; and a ground fault output interface in communication with the current monitoring device to provide ground fault status of the electrical service panel, wherein the current transformer is coupled to the primary bonding location from within the electrical service panel, and wherein the current monitoring device is positioned external to the electrical service panel and is removeably connected to the current transformer through a current transformer connection interface.

11. The ground fault monitoring system of claim 10, wherein the current transformer connection interface includes an electrical threaded nipple.

12. A ground fault monitoring system for an electrical service panel, the ground fault monitoring system comprising:

a current transformer coupled to a primary bonding location of the electrical service panel;

a current monitoring device in communication with the current transformer to detect ground fault electrical current returning to the electrical service panel; and a ground fault output interface in communication with the current monitoring device to provide ground fault status of the electrical service panel, wherein the current monitoring device includes a memory device for recording ground fault electrical current values over time.

13. A ground fault monitoring system for an electrical service panel, the ground fault monitoring system comprising:

a current transformer coupled to a primary bonding location of the electrical service panel;

a current monitoring device in communication with the current transformer to detect ground fault electrical current returning to the electrical service panel; and a ground fault output interface in communication with the current monitoring device to provide ground fault status of the electrical service panel, wherein the current monitoring device includes an alternating current power interface for connecting the current monitoring device to an electrical power source and a direct current power interface for connecting the current monitoring device to a portable power source, and wherein the current monitoring device is configured to:

detect an alternating current disconnection of the electrical power source from the current monitoring device; and when the alternating current disconnection is detected:
transmitting an alternating current power indicator to the ground fault output interface for conveying a power error status; and
enabling the direct current power interface for providing power to the current monitoring device using the portable power source.

14. A ground fault monitoring system for an electrical service panel, the ground fault monitoring system comprising:
a current transformer coupled to a primary bonding location of the electrical service panel;
a current monitoring device in communication with the current transformer to detect ground fault electrical current returning to the electrical service panel; and
a ground fault output interface in communication with the current monitoring device to provide ground fault status of the electrical service panel,
wherein the current monitoring device is in communication with the current transformer via a measurement link, and wherein the current monitoring device is configured to:
detect a measurement link disconnection between the current monitoring device and the current transformer; and
when the measurement link disconnection is detected, transmit a current transformer disconnection indicator to the ground fault output interface for conveying a measurement link status.

15. A method of retrofitting an electrical service panel to detect ground fault electrical current, the method comprising:
removing a main bonding jumper from a primary bonding location of the electrical service panel, wherein removing the main bonding jumper isolates a neutral bus from a grounding electrode conductor of the electrical service panel;
installing an auxiliary bonding jumper at the primary bonding location to provide a low-impedance path between the neutral bus and the grounding electrode conductor of the electrical service panel, the auxiliary bonding jumper being passed through a current transformer positioned within the electrical service panel; and
configuring the current transformer to be removeably connected to a current monitoring device for detecting ground fault electrical current returning to the electrical service panel.

16. The method of claim 15, wherein the current monitoring device is positioned external to the electrical service panel, and wherein the method further comprising:
installing a current transformer connection interface on a user accessible surface of the electrical service panel for removably connecting the current monitoring device to the current transformer via the current transformer connection interface.

17. The method of claim 16, further comprising:
connecting the current monitoring device to the current transformer through the current transformer connection interface.

18. The method of claim 15, further comprising:
connecting an auxiliary device to the current monitoring device through an auxiliary connection link, wherein the auxiliary device is configured to provide a ground fault status based on a ground fault status signal received from the current monitoring device.

* * * * *